March 15, 1938. C. W. MEYERS Re. 20,673
WIRE OR STRIP TINNING MACHINE
Original Filed Sept. 27, 1934
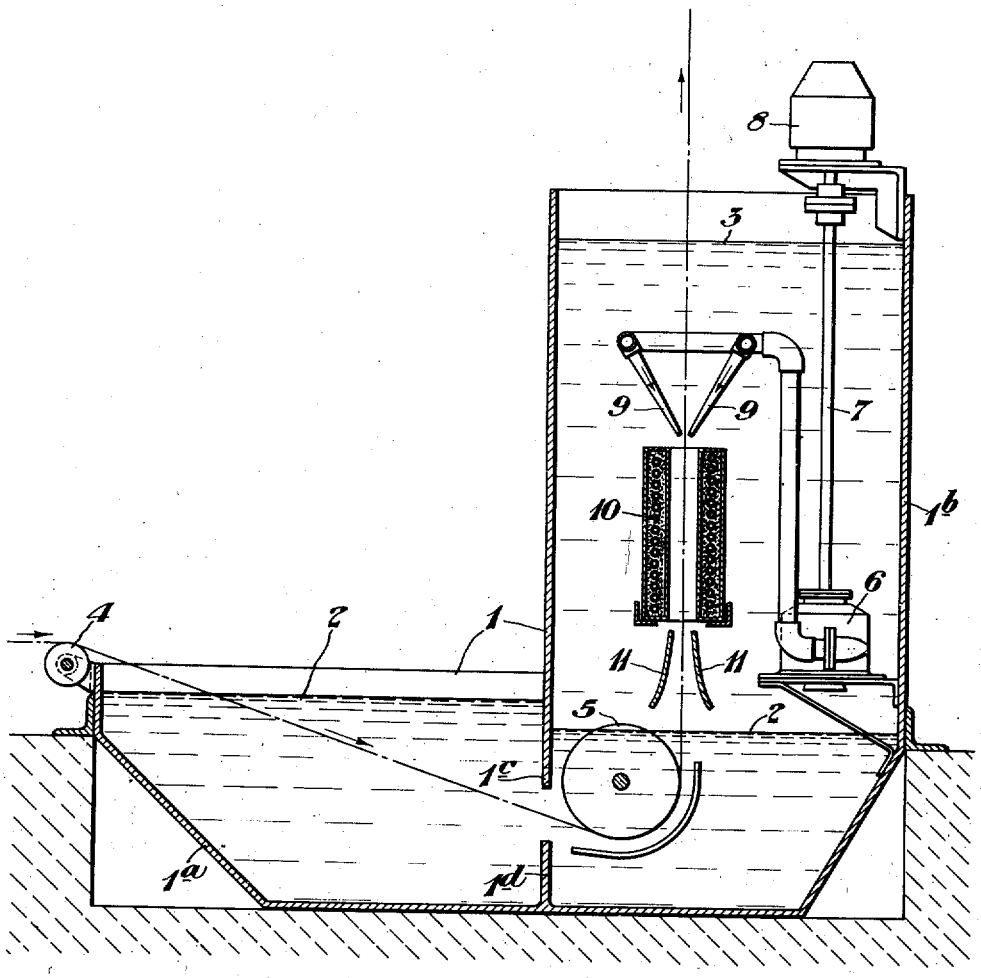
Inventor:
CHARLES W. MEYERS,
by: Usina & Rauber
his Attorneys.

Reissued Mar. 15, 1938 Re. 20,673

UNITED STATES PATENT OFFICE 20,673

WIRE OR STRIP TINNING MACHINE

Charles W. Meyers, Cleveland, Ohio

Original No. 2,079,867, dated May 11, 1937, Serial No. 745,826, September 27, 1934. Application for reissue November 17, 1937, Serial No. 175,163

4 Claims. (Cl. 91—12.2)

This invention relates to wire or strip tinning machines, one of the objects being to apply a smooth, even coating of tin to continuously moving wire or strip. Other objects may be inferred.

The accompanying drawing shows a cross section of a machine constructed according to the invention.

This machine includes a pot 1 for holding molten tin 2 with palm oil 3 floating on the same. This pot is made in the form of two chambers, 1a and 1b, which are separated by a partition 1c that extends almost to the bottom of the pot, and by an elevation 1d in the bottom of the pot.

The continuously moving wire or strip runs over a roller 4 down through the molten tin 2 and into the chamber 1b by way of the space between the partition 1c and elevation 1d where it is guided upwardly by a larger roller 5 through the palm oil 3 and so from the pot.

A pump 6 is submerged in the palm oil 3 in the chamber 1b and is driven through a long shaft 7 by a motor 8. This pump supplies a set of nozzles 9 with a constant flow of palm oil, and these nozzles direct this flow against the wire or strip moving upwardly through the palm oil, in a direction opposite to its movement. This flow of palm oil wipes the wire strip so as to remove surplus tin.

This wiping cannot be done too close to the surface of the molten tin 2 in the chamber 1b because it would cause too much disturbance of the tin. If it is located sufficiently high in the palm oil to avoid this trouble, the tin coating on the strip of wire has become too hardened to be so wiped.

In the machine described, the nozzles 9 are located at a sufficient height in the palm oil above the molten tin to prevent any disturbance of the latter. To enable proper wiping action, a high frequency electric induction heater 10 is immersed in the palm oil between the nozzles 9 and the surface of the tin 2, the wire or strip being passed through this heater after leaving the tin. This raises the temperature of the wire or strip enough to render the tin carried by it sufficiently fluid to permit it to be wiped by the flow of palm oil directed against it by the nozzles 9.

The drawing illustrates the heater 10 as being a coil through which the wire or strip passes, guides 11 functioning to lead the wire strip initially through this coil. The use of an element which heats by induction is important because it permits the addition of heat to the wire or strip without materially raising the temperature of the palm oil or harming the tin coating.

In case the wire or strip is to be heavily coated with tin, it is not necessary to wipe it in the manner described, the heater alone functioning to smooth the tin coating. It should be noted that the heater is immersed in the palm oil above the surface of the tin. Should an attempt be made to heat the wire after it has left the palm oil it would be impossible to procure the smooth and even coating desired.

I claim:

1. A wire or strip tinning machine including the combination of means for holding molten tin with palm oil floating thereon, means for guiding continuously moving wire or strip through said molten tin and upwardly through said palm oil, and means for heating said wire or strip after it has left said molten tin and while it is still in said palm oil, the last named means being an electric induction heater immersed in said palm oil above said molten tin and capable of raising the temperature of said wire or strip without materially raising the temperature of said palm oil or harming the tin coating on said wire or strip.

2. A wire or strip tinning machine including the combination of means for holding molten tin with palm oil floating thereon, means for guiding continuously moving wire or strip through said molten tin and upwardly through said palm oil, means for wiping said wire or strip with a flow of palm oil after it has left said molten tin and at such a height as to avoid material disturbance of the latter, and means for heating said wire or strip after it has left said molten tin and before it is wiped by the third named means.

3. A wire or strip tinning machine including the combination of means for holding molten tin with palm oil floating thereon, means for guiding continuously moving wire or strip through said molten tin and upwardly through said palm oil, means for wiping said wire or strip with a flow of said palm oil after it has left said molten tin and at such a height as to avoid material disturbance of the latter, and means for heating said wire or strip after it has left said molten tin and before it is wiped by the third named means, the last named means being an electric induction heater immersed in said palm oil between the third named means and said molten tin.

4. A wire or strip tinning machine including the combination of means for holding a bath of palm oil, means for guiding continuously moving tinned wire or strip through said palm oil, and means for heating said wire or strip while it is still in said palm oil, the last named means being an electric induction heater immersed in said palm oil and capable of raising the temperature of said wire or strip without materially raising the temperature of said palm oil or harming the tin coating on said wire or strip.

CHARLES W. MEYERS.